United States Patent [19]
Kawakami

[11] 3,896,643
[45] July 29, 1975

[54] LOCKING DEVICE FOR A MOTORCYCLE DRIVER'S HELMET

[75] Inventor: Hideo Kawakami, Hamamatsu, Japan

[73] Assignee: Takagi Tekko Kabushiki Kaisha, Japan

[22] Filed: Nov. 23, 1973

[21] Appl. No.: 418,759

[30] Foreign Application Priority Data
Nov. 26, 1972  Japan.............................. 47-135713

[52] U.S. Cl. .................................................. 70/59
[51] Int. Cl. ........................................... E05b 69/00
[58] Field of Search ............... 70/19, 14, 18, 58, 59, 70/60, 461; 211/8, 9; 248/203; 292/256, 256.69

[56] References Cited
UNITED STATES PATENTS

| | | | |
|---|---|---|---|
| 1,346,964 | 7/1920 | Johnson | 70/19 X |
| 2,171,682 | 9/1939 | Byrnes | 70/59 |
| 3,646,786 | 3/1972 | Baker | 70/59 |
| 3,753,359 | 8/1973 | Frey | 70/19 |

Primary Examiner—Robert L. Wolfe
Attorney, Agent, or Firm—Irving M. Weiner

[57] ABSTRACT

An apparatus for selectively locking and releasing a helmet to the handle bar of a vehicle. A body structure is mounted on the handle bar and has an integral stationary pinch arm extending uprightly from the body structure. The body structure also includes an integral mounting plate member depending therefrom. A pivotal pinch arm is pivotably mounted on the mounting plate member for pivotal movement selectively toward and away from stationary pinch arm for selectively pinching the rear wall of the helmet in cooperation with the stationary pinch arm, and for selectively releasing the helmet.

4 Claims, 5 Drawing Figures

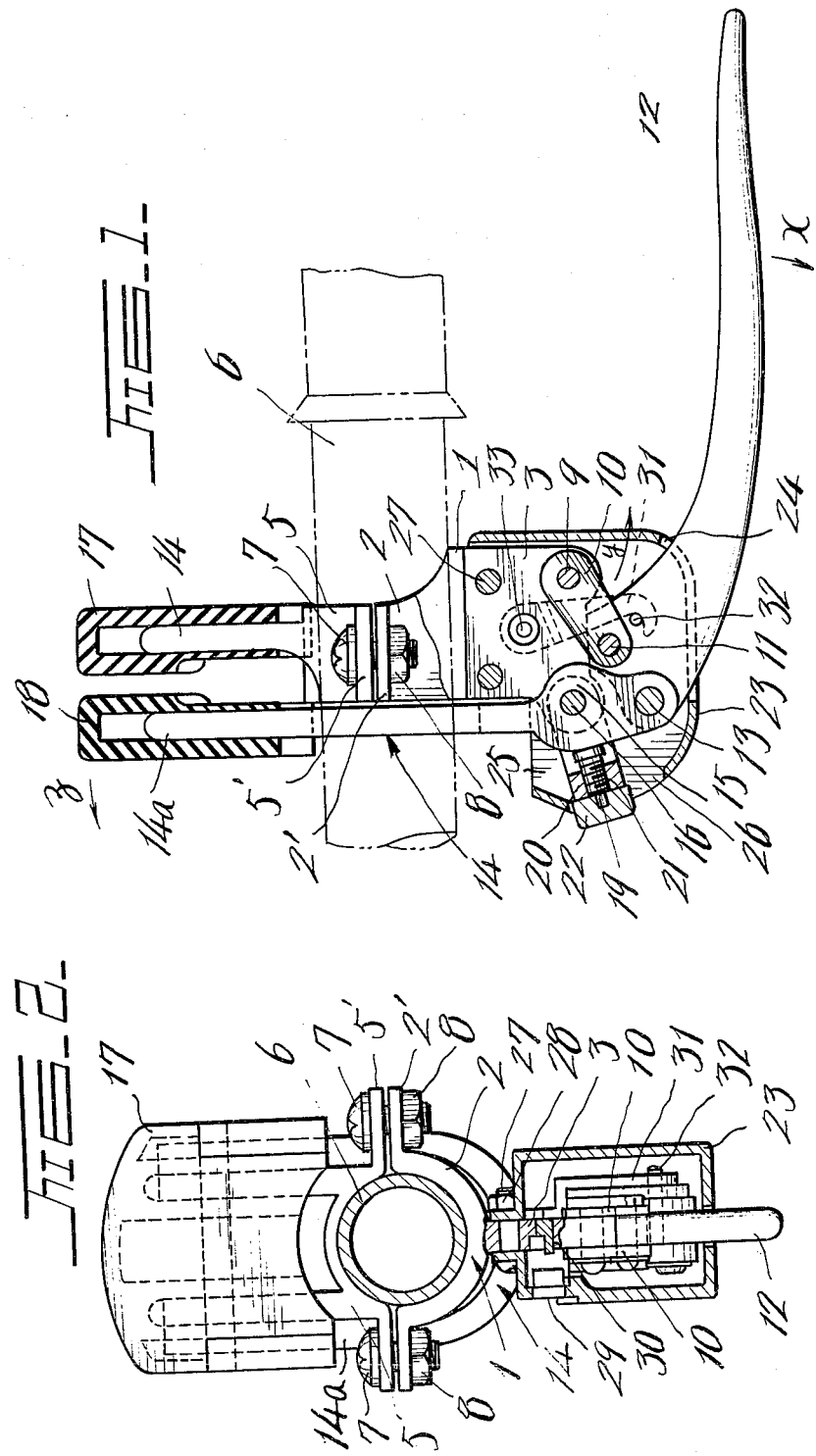

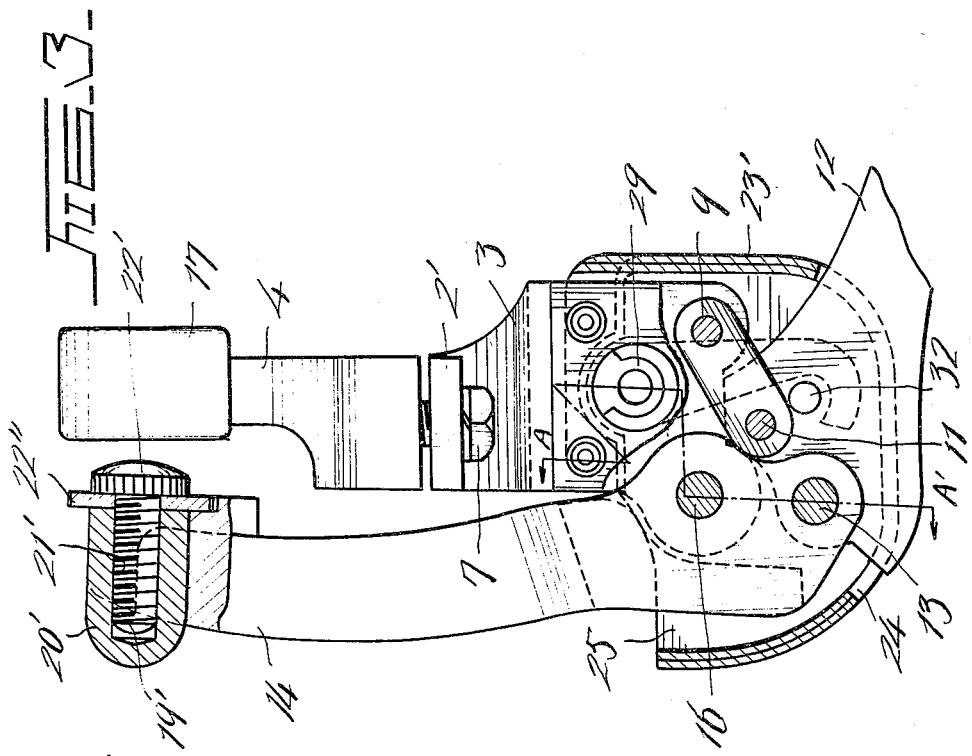
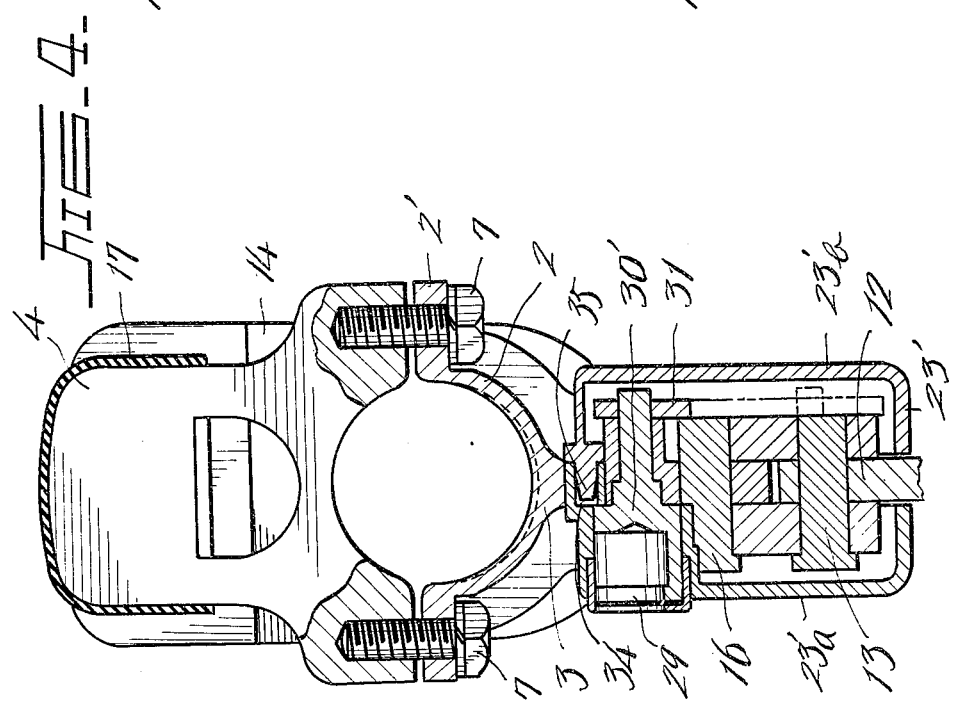

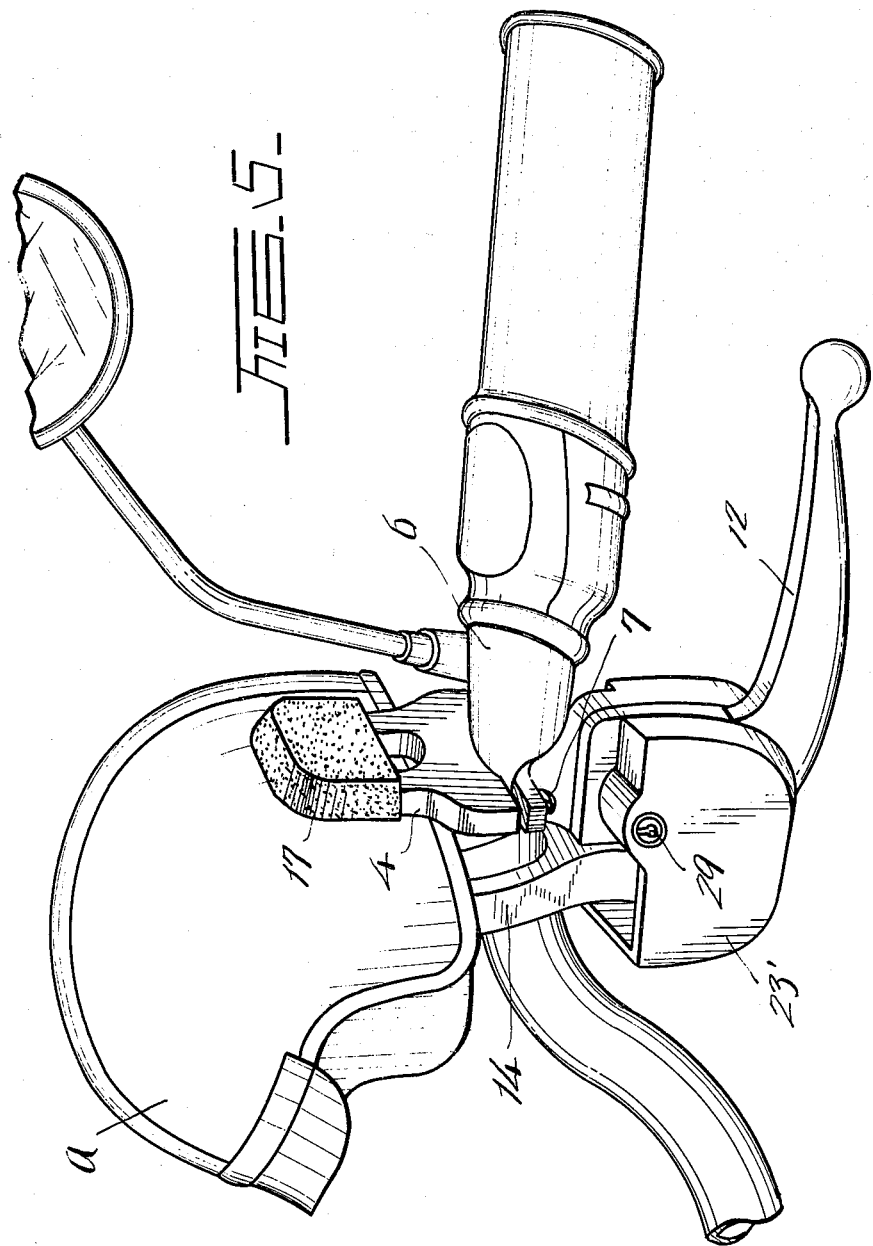

LOCKING DEVICE FOR A MOTORCYCLE DRIVER'S HELMET

The present invention relates to an apparatus for selectively securing and releasing an object, such as a helmet, to the handle bar of a vehicle. In particular, the invention relates to a locking device for a motorcycle driver's helmet and the like, and more particularly, to a locking device for a motorcycle driver's helmet which can be simply and positively mounted on one of the steering handle bars of a motorcycle for locking the helmet on the handle bar against possible theft and which can be detachably mounted on the handle bar.

BACKGROUND OF THE INVENTION

It has been known that a helmet is an important and essential protective article for a motorcycle driver to protect his head against potential traffic accident. When the driver alights from his motorcycle, the driver usually places his helmet on the motorcycle or moves about with the helmet worn on his head or holding the helmet under his arm. However, when the driver moves about with the helmet worn on his head or holding the helmet under his arm, it is very inconvenient for him and there is the possibility of misplacing the helmet. When the helmet is left on the motorcycle, there is the possibility of theft.

Therefore, the present invention eliminates the abovementioned problems which occur when the driver moves about with the helmet worn on his head or holding the helmet under his arm or leaving the helmet on his motorcycle after his alighting form the motorcycle.

SUMMARY OF THE INVENTION

The present invention provides an apparatus for selectively securing and releasing an object to a handle bar of a vehicle. There is provided first means for mechanical interconnection with the handle bar of the vehicle. The first means includes a stationary and a pivotal pinch arm. Second means are mechanically interconnected with the first means for selectively moving the pivotal pinch arm toward the stationary pinch arm to pinch at least a portion of the object therebetween, and for selectively moving the pivotal pinch arm away from the stationary pinch arm to release the portion of the object from between the stationary and pivotal pinch arms.

One object of the present invention is to provide a locking device for a motorcycle driver's helmet which can positively lock the helmet on one of the steering handle arms against potential theft.

According to the present invention, the abovementioned object is attained by the provision of a locking device for a motorcycle driver's helmet which comprises a body including two semi-spherical upper and lower half portions adapted to firmly embrace one of the steering handle bars of a motorcycle, said upper semi-spherical half portion having an integral upright stationary pinch arm and said lower semi-spherical half portion having an integral mounting plate member depending therefrom, an operation lever pivoted at the inner end to said mounting plate member through links, a pivotal pinch arm pivoted at the lower end to the inner end of said operation lever for pivotal movement toward and away from said stationary pinch arm, a bracket fixedly secured to said mounting plate member and having a threaded hole, an adjusting screw adjustably threaded in said threaded hole and having a knob secured to one end thereof and a locking mechanism mounted on said mounting plate member for locking and unlocking said operation lever.

BRIEF DESCRIPTION OF THE DRAWINGS

FIG. 1 is a side elevational view in partial section of a first embodiment of a locking device for a motorcycle driver's helmet as being applied to one of the steering handle bars of a motorcycle.

FIG. 2 is a front elevational view in partial section of said locking device as shown in FIG. 1.

FIG. 3 is a fragmentary side elevational view in partial section of a second embodiment of a helmet locking device for a motorcycle driver's helmet.

FIG. 4 is a cross-sectional view taken substantially along the line A — A' of FIG. 3.

FIG. 5 is a perspective view showing a driver's helmet as held in its locked position on one of the steering handle bars of a motorcycle with the locking device of FIGS. 3 and 4.

DETAILED DESCRIPTION

The present invention will now be described referring to the accompanying drawings, and more particularly to FIGS. 1 and 2 thereof, in which a first embodiment of an apparatus or locking device for an object, such as a motorcycle driver's helmet, is shown. The helmet locking device generally comprises first means or body structure or body 1 which includes a semi-spherical cradle 2 opening on the top and a vertical mounting plate member 3 integrally depending from the cradle. The cradle 2 has an annular peripheral flange 2' surrounding the open top and having a plurality of threaded holes (not shown) for the purpose to be described hereinafter, and is adapted to receive the lower half semi-spherical portion of one of the steering handle bars 6 of a motorcycle (not shown). A mating semi-spherical crown member 5 having the open bottom receives the upper half semi-spherical portion of the handle bar 6 to embrace the periphery of the handle bar in co-operation with the cradle 2. The crown member 5 also has an annular peripheral flange 5' surrounding the open bottom and having a plurality of threaded holes (not shown) which align with the threaded holes in the annular flange 2' of the cradle 2 when the cradle and crown member are assembled together. The cradle 2 and crown member 5 are firmly held in their assembled position embracing the handle bar 6 therebetween by means of set screws 7 and nuts 8 which extend through the aligned threaded holes in the mating cradle and crown member whereby the assembly is held in position on the handle bar 6. The crown member 5 has a stationary arm 4 integrally formed with and extending uprightly from the top of the crown member.

A pair of links 10 are pivoted at one end to the opposite sides of the mounting plate member 3 by means of a pin 9, and second means, such as an operation lever 12, is pivoted at a point adjacent the inner end to the other end of the links 10 by means of a pin 11. A pivotal pinch arm 14 is pivoted at the lower end to the operation lever 12 at a second point adjacent the inner end of the lever spaced from the first-mentioned point where the lever is pivoted to the links 10. The lower end portion of the pivotal arm 14 is provided with an elongated slot 15 for freely receiving a pin 16 which is firmly secured to and laterally extending from the mounting plate member 3. The upper portion of the pivotal arm 14 is positioned in opposite to and spaced from the stationary arm 4 and bifurcated as shown at 14a to provide a pair of prongs which extend uprightly on the opposite sides of the handle bar 6. The stationary pinch arm 4 and the prongs 14a of the pivotal arm are covered by rubber buffering covers 17 and 18, respectively. Thus, when a downwardly directed force is applied to operation lever 12, as indicated by the arrow X in FIG. 1, the links 10 are pivoted about the pin 11 in the arrow Y direction as seen in FIG. 1, which in turn causes the pivotal pinch arm 14 to pivot about the pin 16 away from the stationary pinch arm 4 in the arrow Z direction (FIG. 1) to thereby increase the distance or space between the pivotal and stationary arms 14 and 4, respectively.

According to the present invention, the distance between the stationary and pivotal pinch arms 4 and 14 can be adjusted depending upon the thickness of the rear wall of a particular motorcycle driver's helmet to be held between the stationary and pivotal pinch arms 4 and 14. For the purpose, an adjusting screw 19 is threaded in a female threaded hole 21 in a U-shaped frame 20, which is in turn fixedly mounted at the inner end on the pin 16. The screw 19 has a knob 22 secured thereto for access.

Thus, it will be understood that the pivotal pinch arm 14 is moved toward and away from the stationary pinch arm 4 as the screw 19 is threaded into and out of the threaded hole 21 by turning the knob 22 in one or the other direction. In this fashion the distance or space between the stationary and pivotal arm 14 for accomodating helmets having different rear wall thicknesses.

According to the present invention, there is provided a locking mechanism for maintaining the stationary and pivotal pinch arms 4 and 14 in their helmet holding position against potential theft. Reference numeral 23 denotes a cover which covers the vertical plate member 3 of the body 1 and the parts and portions of the lever and pivotal pinch arm mounted on the mounting plate member. The cover 23 has a first opening 24 on the bottom through which the operation lever 12 extends, a second opening 25 on the top through which the pivotal pinch arm 14 extends, and a third opening 26 at one end through which the knob 22 on the adjusting screw 19 is exposed for access. As seen in FIG. 1, the pivotal connection between the operation lever 12 and pivotal arm 14 is concealed within the cover 23 to make the connection unaccessible. The cover 23 is fixedly secured to the mounting plate member 3 by means of set screws 27 and nuts 28.

The cover 23 is further provided with a key hole 29 and a locking hook member 31 which is pivotably mounted at the upper end on the mounting plate member 3 by means of a pin 33 with its laterally projecting pawl 30 positioned opposite to the key hole 29 to be engaged by a key (not shown) which will be inserted into the key hole. The hook-shaped lower end of the locking hook member 31 is adapted to engage a pin 32 projecting laterally from the operation lever 12 when the locking device of the invention is held in its helmet locking position. Thus it will be understood that when the motorcycle driver inserts his key into the key hole 29 and turns the key until the key engages the pawl 30 with the operation lever 12 in the position as shown in FIG. 1, the lever is locked against movement and thus, the pivotal pinch arm 14 is also held in the position as shown in FIG. 1 in which the pivotal pinch arm 14 cooperates with the stationary pinch arm 4 in holding the driver's helmet firmly therebetween against potential theft.

FIGS. 3 to 5 inclusive illustrate a second embodiment of a locking device for a motorcycle driver's helmet constructed in accordance with the present invention. The second embodiment is substantially identical with the first embodiment except for the construction and arrangement of the pivotal pinch arm, adjusting screw, U-shaped bracked, cover and locking mechanism. The pivotal pinch arm 14 comprises a slightly bent member, instead of the straight member as described in connection with the first embodiment, and has the bifurcated upper end which firmly receives a U-shaped bracket 20' provided with a female-threaded hole 21'. The adjusting screw 19' is adjustably threaded in the threaded hole 21' and has the knob 22' fixedly secured to the end adjacent the stationary pinch arm 4. A lock nut 22'' is disposed about the adjusting screw 19' at the end adjacent the knob 22'. The lower end of the pivotal pinch arm 14' is pivoted to the mounting plate member 3 by means of the pin 16 in the same manner as the pivotal pinch arm 14 in the first embodiment, but is not provided with the elongated slot 15 as described in connection with the pivotal arm 14 in the first embodiment. Thus, it will be understood that by threading the adjusting screw 19' into and out of the threaded hole 21', the distance between the stationary and pivotal pinch arms 4 and 14' and more particularly, the distance between the knob 22' and the rubber cover 17 on the stationary pinch arm can be adjusted for accomodating motorcycle driver's helmets having different rear wall thicknesses.

In the second embodiment, a rotatable rod 30' is employed, instead of the pawl 30 as described in connection with the first embodiment, and the rod is suitably connected to the pivotal locking hook member 31 so that when the rod 30' is turned by a key, the pivotal locking hook member 31 is also pivoted. Furthermore, in the second embodiment, the cover 23', which houses the locking mechanism and portions of the mounting plate member 3, operation lever, pivotal arm and associated linkage, comprises a pair of two half portions 23'a and 23'b which are connected together in a tongue-and-groove relationship. As shown in FIG. 4, the left-half portion 23'a has a recess 34 in the top wall and the right-hand half portion 23'b has a mating tongue 35 received snugly in the recess 34. The second embodiment is operated in the same manner as described in connection with the first embodiment.

In use, when the motorcycle driver depresses the operation lever 12 (the lever is assumed as being unlocked in the position as shown in FIGS. 1 and 3), the lever pivots about the pin 11 in the clockwise direction as seen in FIGS. 1 and 3. The clockwise pivotal movement of the lever in turn causes the pivotal pinch arm 14 or 14' to pivot about the pin 15 in the counter-clockwise direction away from the stationary pinch arm 4 to increase the distance between the two pinch arms sufficient to receive the driver's helmet and the driver then inserts the rear wall of his helmet into the space between the two arms. thereafter, the driver pulls the lever 12 upwardly or causes the lever to pivot about the pin 11 in the counter-clockwise direction which in turn causes the pivotal pinch arm 14 or 14' to pivot about the pin 15 toward the stationary pinch arm 4. When the pivotal pinch arm 14 or 14' reaches its limit of such pivotal movement, as determined by the thickness of the rear wall of the driver's helmet, the helmet is firmly pinched between the two pinch arms. Thereupon the driver inserts his key into the key hole and turns the pawl or rod to the locking position whereby the helmet is firmly held in its locked position against potential theft. Thus, any unauthorized person is prevented from taking the helmet out of between the pinch arms. In order to take the helmet out of the locking device, the above-mentioned procedure is reversed.

While particular embodiments of the invention have been shown and described, it will be obvious to those skilled in the art that changes and modifications may be made without departing from the invention in its broader aspect and therefore, the aim in the appended claims is to cover all such changes and modifications as fall within the true spirit and scope of the invention.

I claim:
1. An apparatus
for selectively securing and releasing a helmet to the handle bar of a vehicle, comprising, in combination:
a body structure adapted to be mounted on said handle bar of said vehicle and having an integral stationary pinch arm extending uprightly on said body structure;
said body structure including an integral mounting plate member depending therefrom;
a pivotal pinch arm pivotably mounted on said mounting plate member for pivotal movement toward and away from said stationary pinch arm for selectively pinching the rear wall of said helmet in co-operation with said stationary pinch arm, and for selectively releasing said helmet;
an operation lever pivoted to said mounting plate member and to said pivotal pinch for pivotably moving said pivotal pinch arm toward and away from said stationary pinch arm so as to increase and reduce the distance between said stationary and pivotal pinch arms; and
a locking mechanism mounted on said mounting plate member for locking said operation lever when said helmet is pinched between said stationary and pivotal pinch arms.

2. An apparatus
for selectively securing and releasing a helmet to the handle bar of a vehicle, comprising, in combination:
a body structure adapted to be mounted on said handle bar of said vehicle and having an integral stationary pinch arm extending uprightly on said body structure;
said body structure including an integral mounting plate member depending therefrom;
a pivotal pinch arm pivotably mounted on said mounting plate member for pivotal movement toward and away from said stationary pinch arm for selectively pinching the rear wall of said helmet in co-operation with said stationary pinch arm, and for selectively releasing said helmet;
said body structure includes upper and lower semi-spherical half portions embracing said handle bar of said vehicle;
said upper half portion includes said stationary pinch bar; and
said lower half portion includes said mounting plate member.

3. An apparatus
for selectively securing and releasing an object to a handle bar of a vehicle, comprising, in combination:
first means for mechanical interconnection with said handle bar of said vehicle;
said first means including a stationary pinch arm and a pivotal pinch arm;
second means mechanically interconnected with said first means for selectively moving said pivotal pinch arm toward said stationary pinch arm to pinch at least a portion of said object therebetween, and for selectively moving said pivotal pinch arm away from said stationary pinch arm to release said portion of said object from between said stationary and pivotal pinch arms;
said first means comprises a body structure which includes an upper semi-spherical half portion opening on the bottom and having integral therewith said stationary pinch arm extending uprightly from said upper half portion and a lower semi-spherical half portion opening on the top and having a mounting plate member depending therefrom;
said upper and lower semi-spherical half portions being adapted to embrace said handle bar of said vehicle therebetween;
said second means including an operation lever pivoted at the inner end to said mounting plate member via links;
said pivotal pinch arm being pivoted at its lower end to the inner end of said operation lever for pivotal movement toward and away from said stationary pinch arm so as to pinch said object in co-operation with said stationary pinch arm, and to selectively release said object;
a bracket is secured to said mounting plate member and is provided with a threaded aperture therein;
an adjusting screw is adjustably threaded in said threaded aperture and is provided with a knob secured thereto for adjusting the distance between said stationary and pivotal pinch arms; and
a locking mechanism is mounted on said mounting plate member for holding said operation lever in a locking position and for releasing said operation lever from said locking position.

4. An apparatus according to claim 3, wherein:
a. said vehicle is a motorcycle;
b. said object is a helmet for the motorcycle driver;
c. said locking mechanism includes a locking hook member pivoted at its upper end to said mounting plate member, and provided with a hook at its lower end, and having a lateral pawl to be engaged by a key; and
d. a pin extends laterally from said operation lever and is adapted to engage said hook at the lower end of said locking hook member.

* * * * *